United States Patent [19]

Hoadley

[11] 4,350,314
[45] Sep. 21, 1982

[54] WING MOUNTED STALL CONDITION DETECTOR

[75] Inventor: Arthur W. Hoadley, Portage, Mich.

[73] Assignee: The Board of Trustees of Western Michigan University, Kalamazoo, Mich.

[21] Appl. No.: 168,838

[22] Filed: Jul. 10, 1980

[51] Int. Cl.³ .............................................. G01C 21/00
[52] U.S. Cl. ...................................... 244/1 R; 73/180
[58] Field of Search ..................... 73/180, 147, 178 R; 244/1 R, 76 B, 76 C, 203

[56] References Cited

U.S. PATENT DOCUMENTS

| | | | |
|---|---|---|---|
| 2,287,497 | 6/1942 | Rockefeller | 244/1 R |
| 2,635,152 | 4/1953 | Dyche, Jr. | 244/1 R |
| 3,327,529 | 6/1967 | Bowies et al. | 73/180 |
| 3,580,069 | 5/1971 | Warren et al. | 73/180 |
| 4,235,104 | 11/1980 | Hoadley et al. | 73/180 |

Primary Examiner—Donald O. Woodiel
Attorney, Agent, or Firm—Blanchard, Flynn, Thiel, Boutell & Tanis

[57] ABSTRACT

An aircraft instrument system for use on winged aircraft having an indicator visibly displaying a linearly variable ratio of a first pressure differential between a first pressure at a first location on the wing and a second pressure at a second location on the wing spaced from the first location and a second pressure differential between a third pressure at a third location on the wing and a fourth pressure at a fourth location on the wing spaced from the third location. An air pressure-electrical transducer is provided which is responsive to the first, second, third and fourth pressures for producing plural electrical signal outputs indicative of the individual pressures thus detected. An electrical circuit is responsive to each of the electrical signal outputs for producing a quotient signal representing the aforesaid linearly variable ratio. The indicator is responsive to the quotient signal. The air pressure-electrical transducer is fixedly mounted inside a compartment in the wing of the aircraft. An air-water separator unit is also provided in the compartment to facilitate the removal of water that may enter the orifices on the wing and through which the first, second, third and fourth pressures are transmitted to the air pressure-electrical transducer.

8 Claims, 11 Drawing Figures

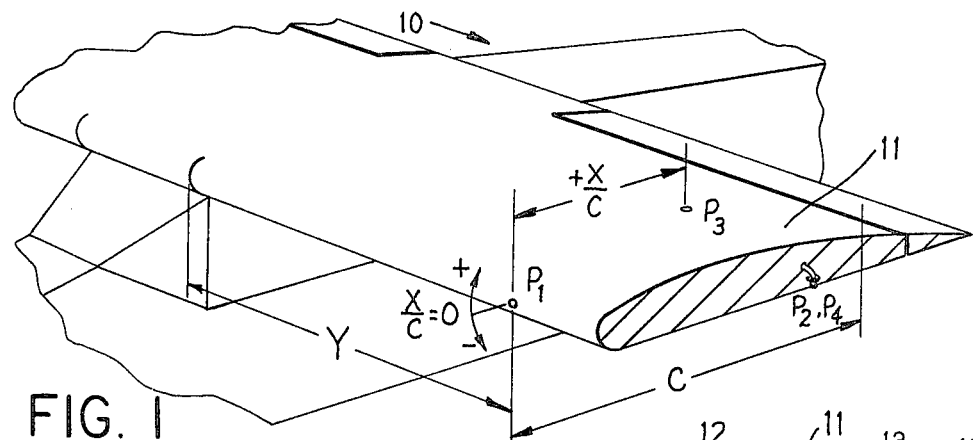
FIG. 1
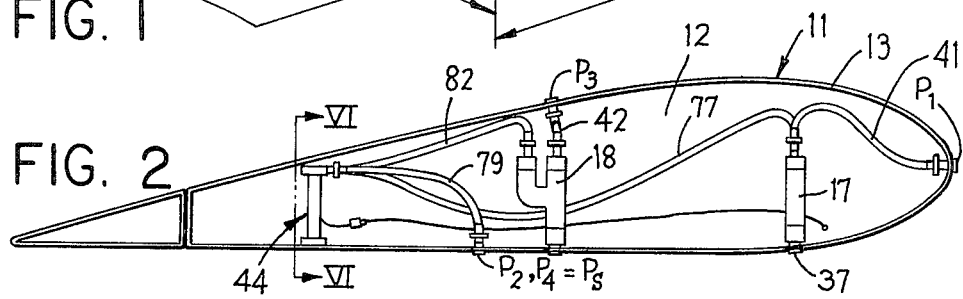
FIG. 2
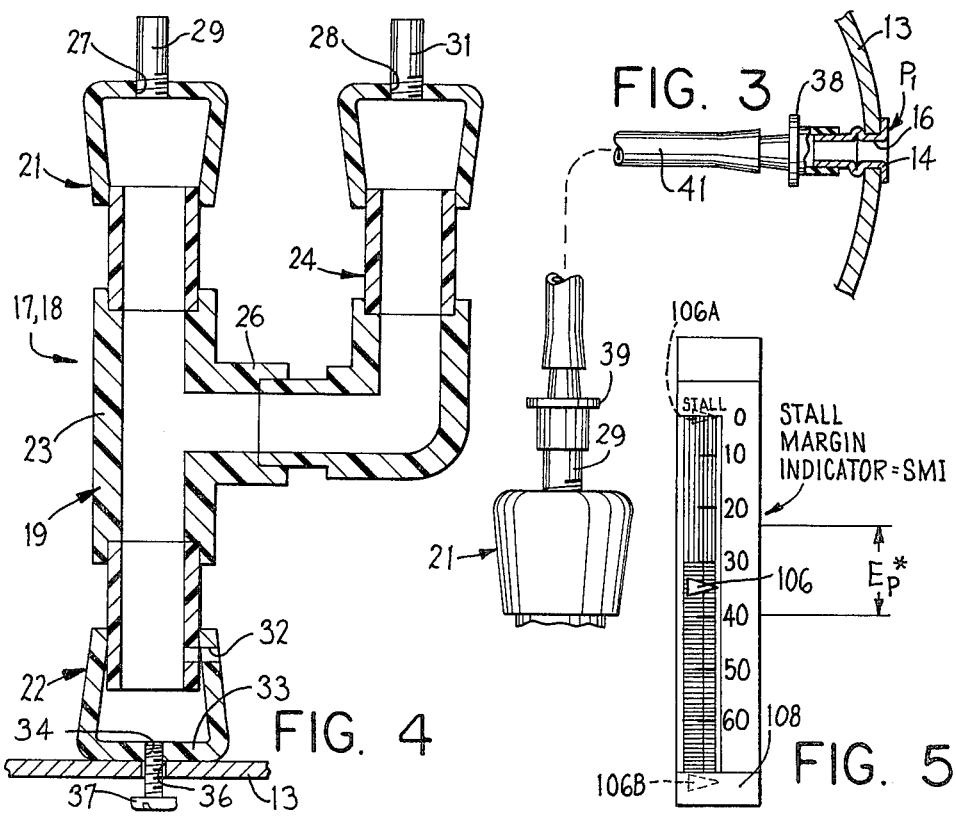
FIG. 3
FIG. 4
FIG. 5

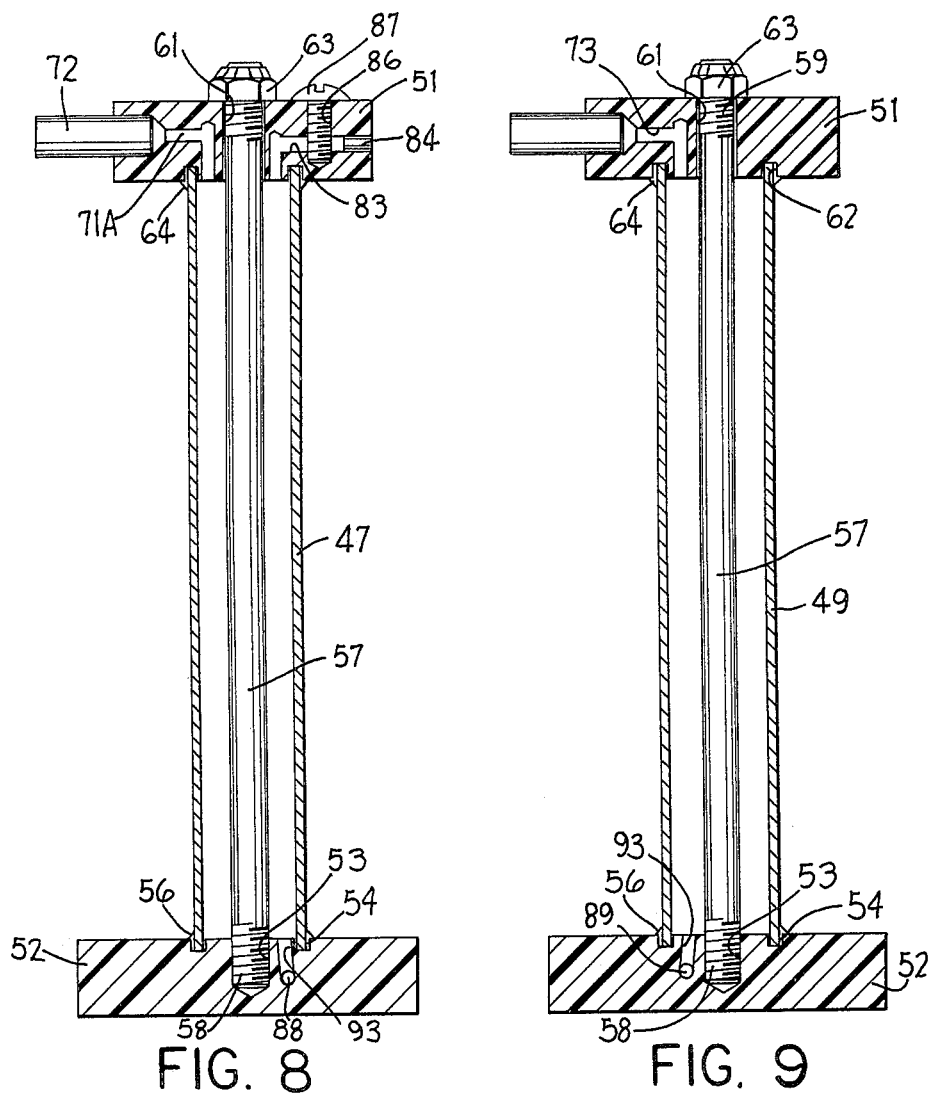

WING MOUNTED STALL CONDITION DETECTOR

CROSS-REFERENCE TO A RELATED APPLICATION

The subject matter of this application is closely related to the subject matter of application Ser. No. 21,617, filed Mar. 19, 1979, now U.S. Pat. No. 4,235,104, and assigned to the same assignee as is the present invention.

FIELD OF THE INVENTION

This invention relates to an aircraft instrumentation system for aircraft and, more particularly, to an instrument for measuring and indicating a linearly varying ratio of pressure differentials detected on the surface of the wing utilizing an air pressure-electrical transducer fixedly mounted in a compartment in the interior of the wing.

BACKGROUND OF THE INVENTION

In an effort to continually improve the instrumentation system disclosed in application Ser. No. 21,617, filed Mar. 19, 1979, I have developed appropriate structure which will facilitate the mounting of an air pressure-electrical transducer in the wing structure of the aircraft. The air pressure-electrical transducer effects a converting of the air pressures detected on the surface of the wing to electrical signals which can be utilized in the production of a quotient signal representing a linearly variable ratio of a first pressure differential between two pressures detected on the surface of the wing and a second pressure differential between two other pressures detected at other locations on the wing. The placement and orientation of the orifices on the wing are described in the aforementioned application Ser. No. 21,617.

Accordingly, it is an object of this invention to provide in an instrumentation system an arrangement of structure which can be easily mounted in the aircraft, preferably in a compartment of the wing so that the connections from the air pressure-electrical transducer to the orifices on the surface of the wing can be minimized as much as possible and to facilitate an easy servicing of the structure, as well as administering pre-flight checks.

It is a further object of this invention to provide an instrumentation system, as aforesaid, which can be easily installed into existing aircraft with a minimum of alteration of the aircraft structure, thereby making it possible for such installations to be made in the field.

It is a further object of this invention to provide an instrumentation system, as aforesaid, which is reliable and durable and will indicate to the pilot of the aircraft the aircraft's position with respect to stall at all times, even as the power or throttle setting and flap setting are changed.

It is a further object of this invention to provide an instrumentation system, as aforesaid, which produces an electrical signal representing a nondouble-valued ratio totally in response to the particular placement of orifices on the wing surface of the aircraft and totally independent of any equipment compensating for variations in the flat setting and/or power setting.

SUMMARY OF THE INVENTION

In general, the objects and purposes of the invention are met by providing an aircraft instrumentation system for indicating the ratio of a pressure differential between two pressure locations on the aircraft and the pressure differential between two more pressure locations on the aircraft remote from the first mentioned two pressure locations. If desired, one of the pressure locations in each pressure differential on the aircraft can be at a common location. An air pressure-electrical transducer device is provided which is responsive to the pressures to determine and indicate a coefficient of pressure ratio. The air pressure-electrical transducer device is mounted in a compartment in the interior of the wing. An air-water-sediment separator unit is also mounted in the compartment and is connected in circuit between the orifices on the wing surface and the air pressure-electrical transducer device to facilitate the separation of water and sediment that may enter the orifices on the wing surface.

BRIEF DESCRIPTION OF THE DRAWINGS

Further objects and purposes of this invention will be apparent to persons acquainted with apparatus of this general type upon reading the following specification and inspecting the accompanying drawings, in which:

FIG. 1 is a perspective view of a fragment of an aircraft having pressure detecting orifices located on the wing thereof;

FIG. 2 is a sectional view through the wing of the aircraft and illustrating a compartment located therein;

FIG. 3 is an enlarged fragment of an orifice on the wing surface and its connection to an air-water-sediment separator unit;

FIG. 4 is an enlarged central cross-sectional view of an air-water-sediment separator unit;

FIG. 5 is a front view of a stall margin indicator (SMI) which visibly displays the linearly variable ratio;

FIG. 8 is a sectional view taken along the line VIII—VIII of FIG. 7;

FIG. 9 is a sectional view taken along the line IX—IX of FIG. 7;

DETAILED DESCRIPTION

Figure 6:
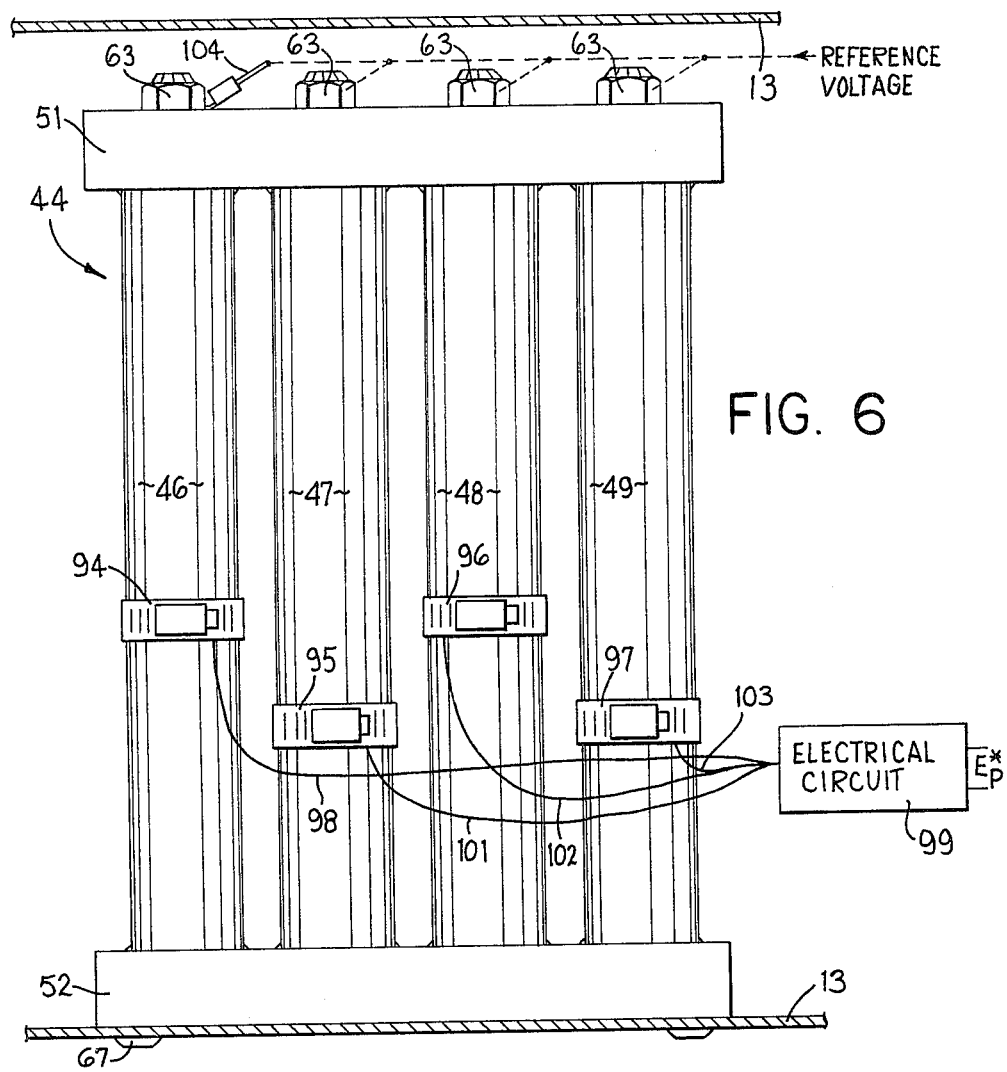
FIG. 6 is a front elevational view of the air pressure-electrical transducer device.

FIG. 1 illustrates certain dimensional relationships on a single-engine propeller-driven aircraft, such as a Cessna 150, for one set of points in a family of points (see application Ser. No. 21,617) wherein $+X/C$ is equal to approximately 50% for point $P_3$ and $X/C$ is equal to approximately zero for point $P_1$ with points $P_2$ and $P_4$ being located to indicate static or barometric pressure $P_S$. The span Y in a Cessna 150 is approximately 29 inches as measured from the door post. Other dimensional relationships will satisfactorily work provided the points are within the family of points described in application Ser. No. 21,617. Thus, this application is not to be limited to the specific dimensional relationships mentioned hereinabove.

As is illustrated in FIG. 1, the aircraft 10 has a wing 11 thereon, the interior of which is free of structure so as to define a compartment 12 therein, as illustrated in FIG. 2. Plural orifices $P_1$, $P_2$, $P_3$ and $P_4$ are provided on the wing surface 13 and provide communication from the exterior thereof into the compartment 12. The orifice $P_1$ is shown more clearly in FIG. 3 and comprises a hollow rivet 14 having a central opening 16 extending therethrough. The hollow rivet 14 is also used for the orifices $P_2$, $P_3$ and $P_4$.

A pair of air-water-sediment separator units 17 and 18 is fixedly mounted in the compartment 12 by any appropriate and conventional means not illustrated. While the air-water-sediment separator units are shown to be composed of plural piping components, it is to be recognized that other constructions will also work and may be desirable. In this embodiment, however, each air-water-sediment separator unit 17 and 18 is composed of a hollow T-shaped member 19 and end cap structures 21 and 22 fixedly connected to opposite ends of the vertically oriented cross portion 23 of the T-shaped member 19. An elbow end cap structure 24 is fixedly secured to the stem portion 26 of the T-shaped member 19. An internally threaded opening 27 is provided in the upper end cap structure 21 and an internally threaded opening 28 is provided in the upper end of the elbow end cap structure 24 and each thereof is adapted to receive a tubular stub member 29 and 31, respectively, therein. The lower end cap structure 22 has an orifice 32 in the sidewall thereof spaced upwardly from the bottom wall 33. An internally threaded opening 34 extends through the bottom wall 33 and is axially aligned with a corresponding opening 36 in the wing surface 13. A screw 37 is threadedly received in the opening 34 to seal off or close the opening 34. The purpose of the air-water-sediment separator units 17 and 18 will be described in detail below.

The inner end of each of the hollow rivets 14 (FIG. 3) has a flexible tubing connector 38 fixedly secured thereto. Similarly, each of the ends of the tubular stub members 29 and 31 of the air-water-sediment separator units 17 and 18 also has a flexible tubing connector 39 fixedly secured thereto. Flexible tubing, such as a rubber tube 41, is connected to and extends between the flexible tubing connector 38 associated with the orifice $P_1$ and the flexible tubing connector 39 associated with the tubular stub member 29. A short flexible tube 42 is connected to a flexible tubing connector associated with the orifice $P_3$ and the tubular stub member 29 on the air-water-sediment separator unit 18.

A further air-water-sediment separator unit could, if desired, be used in conjunction with the orifices $P_2$ and $P_4$. However, experience has shown that water and sediment will not interfere with the orifices $P_2$ and $P_4$ since they are on the underside of the wing. Therefore, an air-water-sediment separator unit has not been shown in association with the orifices $P_2$ and $P_4$.

An air pressure-electrical transducer unit 44 is fixedly mounted in the compartment 12 as shown in FIGS. 2 and 6. The air pressure-electrical transducer unit 44 has four electrically conductive hollow tubes 46, 47, 48 and 49 made of, for example, stainless steel. Each of the tubes 46 to 49 is clamped between a pair of end plates 51 and 52. More specifically, the bottom end plate 52 has four internally threaded blind holes 53 therein, each of which is located in the center of each of the tubes 46 to 49. In addition, an annular groove 54 encircles the blind hole 53 and is concentric with the axis of the hole 53.

The diameter of the annular groove 54 is such as to accommodate the receipt of the lower end of the tubes 46 to 49 therein. A sealant 56 is provided for sealing the tubes 46 to 49 to the end plate 52. An electrically conductive rod 57 having externally threaded end segments 58 and 59 is received inside of each of the tubes 46 to 49 with the threaded segment 58 being threadedly engaged with the internally threaded opening 53 in the end plate 52. In this particular embodiment, the rods 57 are made of stainless steel. The threaded end segment 59 of each of the rods 57 extends upwardly through the center of and beyond the upper end of each of the tubes 46 to 49. The end plate 51 has a plurality of holes 61 extending therethrough, with each hole having an annular groove 62 concentrically encircling the hole 61. The diameter of the annular groove 62 is equal to the diameter of the annular groove 54 in the end plate 52 to facilitate the accommodation of the upper end of the tubes 46 to 49 therein. Each of the holes 61 receives the upper threaded end segment 59 of the rods 57 therein. The upper end of the threaded end segment 59 projects upwardly above the upper surface of the end plate 51. A nut 63 is threadedly engaged with the upper threaded end segment 59 to draw the end plates 51 and 52 toward each other to clamp the tubes 46 to 49 therebetween. A sealant 64 is provided in the annular groove 62 to seal the tubes 46 to 49 to the upper end plate 51. The bottom end plate 52 has a plurality of internally threaded holes 66 therein adapted to receive screws 67 therein to facilitate a securement of the air pressure-electrical transducer unit to the wing surface 13 as shown in FIG. 6.

Figure 7:
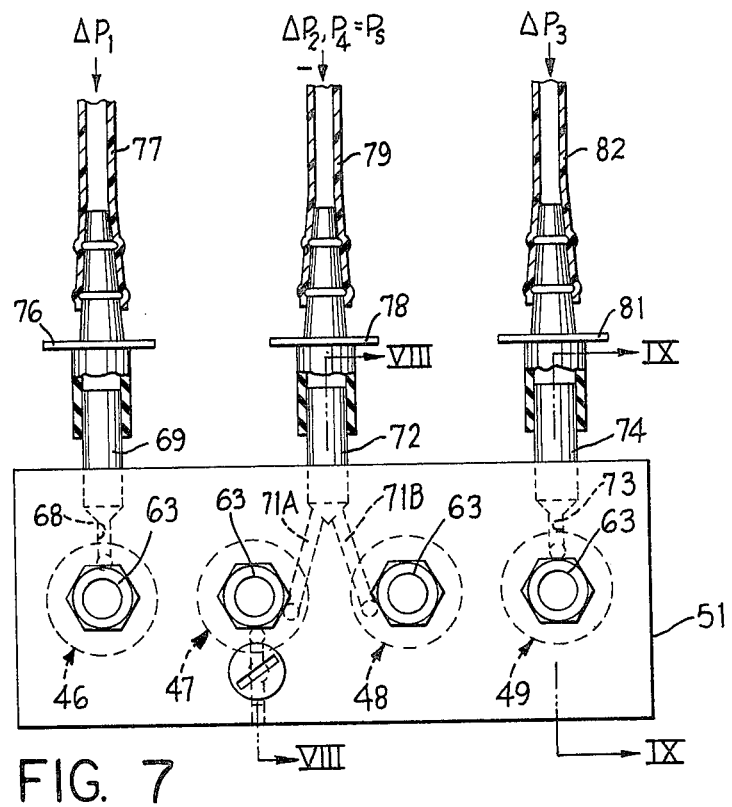
FIG. 7 is a top view of the air pressure-electrical transducer device.

The upper end plate 51 has plural passageways communicating with the upper ends of and the interior of each of the tubes 46 to 49. More specifically, the end plate 51 has a passageway 68 (FIG. 7) communicating with the interior of the tube 46. A tubular stub member 69 is connected to the passageway 68 and extends externally of the end plate 51. A pair of passageways 71A and 71B each communicates with a common tubular stub member 72 which extends externally of the end plate 51 parallel to the tubular stub member 69. The passageway 71A communicates to the interior of the tube 47, whereas the passageway 71B communicates with the interior of the tube 48. A passageway 73 communicates with the interior of the tube 49 and a tubular stub member 74 which extends externally of the end plate 51. The tubular stub members 69, 72 and 74 extend parallel to each other and lie in a common horizontal plane. A flexible tube connector 76 is connected to the tubular stub member 69. A flexible tube 77 is connected to the flexible tube connector 76 and extends therefrom to the flexible tube connector 39 associated with the tubular stub member 31 on the air-water separator unit 17. Similarly, a flexible tube connector 78 is connected to the tubular stub member 72 and a flexible tube 79 is connected thereto and extends therefrom to the flexible tube connector associated with the hollow rivet 14 in which is detected the static pressure $P_S$ corresponding to the common location at which the pressures $P_2$ and $P_4$ are detected on the under surface of the wing 11. A flexible tube connector 81 is connected to the tubular stub member 74 and a flexible tube 82 is connected thereto and extends therefrom to the flexible tube connector 39 associated with the tubular stub member 31 on the air-water-sediment separator unit 18.

A further passageway 83 (FIG. 8) is provided in the upper end plate 51 and is blocked off at the edge of the plate 51 by a plug 84. The passageway 83 communicates with the interior of the tube 47. An internally threaded opening 86 is provided in the end plate 51 and communicates with the end of the passageway 83 adjacent the innermost end of the plug 84. A screw 87 is received in the opening 86 to close off the communication of the passageway 83 to the exterior of the end plate 51 through the opening 86. The purpose of the passageway 83 and screw 87 will be explained below.

Figure 11:
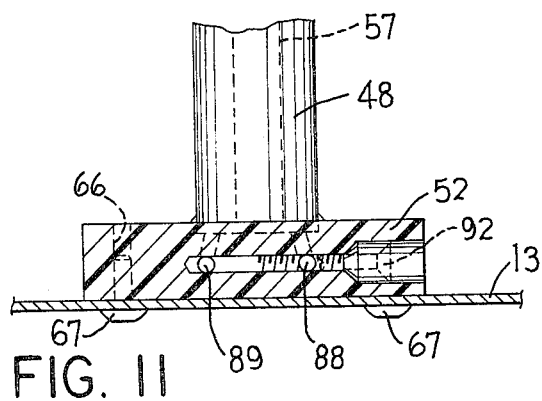
FIG. 11 is a sectional view taken along the line XI—XI of FIG. 10.

The lower end plate 52 has a pair of passageways 88 and 89 interconnected at their innermost ends by a further passageway 91. The passageways 88 and 89 are parallel but laterally offset from one another and the passageway 91 extends perpendicular between the inner ends of both of the passageways 88 and 89. The passageway 91 is partially internally threaded and is adapted to receive a screw 92 therein. When the screw 92 is located in the passageway 91, it blocks the communication between the passageways 88 and 89. The screw 92 is movable to a position, such as the broken-line position illustrated in FIG. 11, to facilitate a communication between the passageways 88 and 89 through the passageway 91. The purpose of this construction will be explained in detail below. Appropriate passageways 93 are provided in the end plate 52 to provide communication between the inside of the tubes 46 and 47 with the passageway 88 and the inside of the tubes 48 and 49 with the passageway 89.

Each of the tubes 46 to 49 has a clamp 94 to 97, respectively, on the exterior thereof. In this particular embodiment, the clamps 94 to 97 are conventional hose clamps shown only in FIG. 6. A wire 98 is connected to the hose clamp 94 and extends to an electrical circuit 99. A wire 101 interconnects the clamps 95 to the electrical circuit 99. A wire 102 interconnects the clamp 96 to the electrical circuit 99. A wire 103 is connected to the clamp 97 and extends therefrom to the electrical circuit 99. Power is supplied to the wire rods 57 through appropriate wires, only one wire 104 of which is illustrated in FIG. 6. The four wires 98, 101, 102 and 103 to the electrical circuit 99 correspond to the four input wires appearing in FIG. 3 of the aforesaid application Ser. No. 21 617. The amount of capacitance in each of the tubes 46 to 49 is detected and transmitted through the aforesaid wires 98, 101, 102 and 103 to the electrical circuit 99 which produces a quotient signal $E_P{}^*$ which is, in turn, fed to the stall margin indicator (SMI) illustrated in FIG. 5.

OPERATION

While the operation of the instrumentation system will be readily apparent to those skilled in the art and following a study of application Ser. No. 21,617, the following discussion will be presented for convenience.

Figure 10:
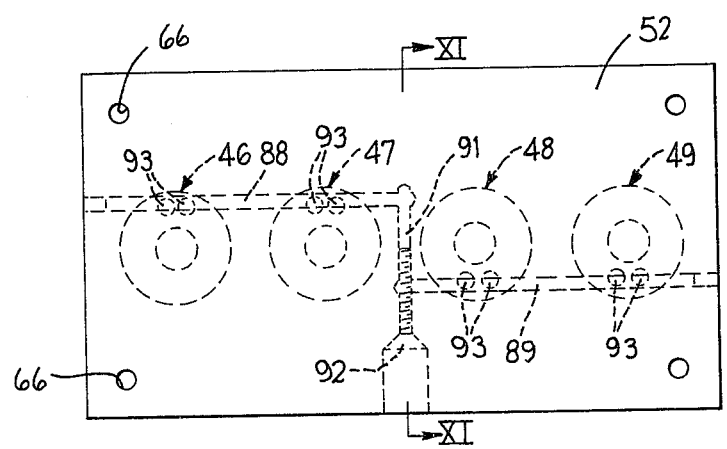
FIG. 10 is a bottom view of the air pressure-electrical transducer device.

The air pressure-electrical transducer device 46 is first filled with an appropriate electrically nonconductive liquid with a high dielectric constant, such as a mixture which will not freeze, as a mixture of fifty percent glycol and fifty percent distilled water. This mixture is added to the tube 47 by first removing the screw 87 and introducing the liquid through the opening 86. The liquid will fill not only the tube 47, but will also pass through the connected passageways 88 and 93 to the tube 46. When the tubes 46 and 47 are completely filled, the screw 87 is replaced to seal off the passageway 83. Similarly, the passageways 71A and 68 will also be sealed to prevent a spilling of liquid therethrough. The air pressure-electrical transducer unit can thereafter be shipped to a designated location. When the air pressure-electrical transducer unit is installed into the compartment 12 in the wing of the aircraft, the screw 92 will then be partially removed to the FIG. 11 position to provide communication between the passageways 88 and 89 through the passageway 91. The liquid in the tubes 46 and 47 will gradually lower while the liquid level rises in the tubes 48 and 49. When the liquid levels are equal, following a predesignated period of time and assuming, of course, that the tubes 46 to 49 are in a vertically aligned arrangement, the liquid level will be equal in all four of the tubes 46 to 49. Thereafter, the screw 92 can be returned to block the communication between the passageways 88 and 89 as shown in FIG. 10. The passageways 71A and 68 can be opened and appropriate tubes 77, 79 and 82 connected to the tubular stub members 69, 72 and 74, respectively, as well as to the air outlet passageway corresponding to the tubular stub members 31 on the air-water-sediment separator units 17 and 18 and to the common pressure detecting port corresponding to orifice $P_2$, $P_4$ whereat the static pressure $P_S$ is to be detected. Other connections are also made to connect the orifices $P_1$ and $P_3$ to the air-water-sediment inlet to each of the air-water-sediment separator units 17, 18. Since the pressure differentials which satisfy the formula $$C_P{}^* = (P_1 - P_2)/(P_3 - P_4)$$

can oftentimes exceed the pressure limits of the air pressure-electrical transducer unit, the hole 32 in each of the air-water-sediment separator units 17 and 18 causes a predesignated pressure drop to occur between the pressure entering the air-water-sediment inlet 27 and the air leaving through the air outlet tube 31. That is, air will bleed through the opening 32, thereby rendering the pressure at the air outlet tube 31 less than the pressure at the air-water-sediment inlet 29. Any pneumatic gain changes in the pressure differentials will be corrected for in the electrical circuit 99 gain adjustments, thus leaving no net change in the above set forth formula. It is, of course, recognized that the diameter of the hole 32 can be varied to accommodate differing conditions. However, it has been found that a fixed diameter determined at the factory will suffice in all cases.

If water and sediment should enter the orifices $P_1$ and $P_3$, the pressure differential between the entrance to the orifice and the inside of the air-water-sediment separator unit will cause the water and sediment to travel through the tubes 41 and 42 so that inside the air-water-sediment separator units the sediment will be deposited in the lower end cap structure 22 where sediment will be collected therein and the water will drain out of hole 32. Thus, as a periodic maintenance check, the screw 37 will be removed to remove any sediment that may be present therein.

The detected pressures will be transmitted to the air pressure-electrical transducer unit 46 and cause a variance in the liquid levels in each of the tubes 46 to 49. The capacitance detected at the clamps 94 to 97 will be delivered to the electrical circuit 99 through the wires 98, 101, 102 and 103 in a manner disclosed in application Ser. No. 21,617 to provide a quotient signal $E_P{}^*$.

The stall margin indicator (SMI) has an indicator arrow 106 thereon which moves toward the stall (upper) end of the scale as the quotient signal $E_P{}^*$ increases. At stall, the indicator arrow 106 will stop at the top of the scale at position 106A. As the arrow 106 moves above a predetermined value, such as 20, a horn will sound indicating that the aircraft is approaching stall. If, on the other hand, there is a power failure, the indicator arrow 106 will disappear beneath a flap 108 at the lower end of the scale to the position 106B to clearly indicate to the pilot that the stall margin indicator is inoperative. The indicia appearing on the scale of the stall margin indicator indicates the margin between the aircraft's present condition to the stall condition. The numerical indicia decreases in value as the indicator arrow moves upwardly on the scale so that at a zero indication, there will be a zero SMI indicating to the pilot that the aircraft is at stall. Thus, the pilot will soon learn that the SMI for the aircraft will be visibly indicated so that the pilot will know at all times the aircraft's relative position to the stall condition independent of flap setting, as explained in detail in application Ser. No. 21,617.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an aircraft instrument system for use on a winged aircraft, comprising an indicator visibly displaying a linearly variable ratio of a first pressure differential between a first pressure at a first location on said wing and a second pressure at a second location on said wing spaced from said first location and a second pressure differential between a third pressure at a third location on said wing and a fourth pressure at a fourth location on said wing spaced from said third location, first means responsive to said first, second, third and fourth pressures for producing plural electrical signal outputs indicative of the individual pressures thus detected, electrical circuit means responsive to each of said electrical signal outputs for producing a quotient signal representing said linearly variable ratio and second means for effecting a connection of said quotient signal to said indicator to render said indicator responsive to said quotient signal, the improvement comprising:
compartment means inside the wing of said winged aircraft, said first means being received in said compartment means;
securement means for securing said first means in said compartment means;
first, second, third and fourth orifice means providing communication between the exterior and interior of said wing;
air-water-sediment separator means and third means for securing said air-water-sediment separator means in said compartment means, said air-water-sediment separator means having means defining an air-water-sediment inlet, an air outlet and an intermediate sediment collection chamber;
first conduit means for connecting at least one of said first, second, third and fourth orifice means to said air-water-sediment inlet on said air-water-sediment separator means;
second conduit means for connecting said air outlet on said air-water-sediment separator means to said first means; and
third means for connecting the remainder of said first, second, third and fourth orifice means to said first means.

2. The aircraft instrument system according to claim 1, wherein said first and second orifice means are located adjacent the leading edge and intermediate said leading edge and trailing edge of said wing, respectively, wherein said air-water-sediment separator means includes at least a pair of separate air-water-sediment separators, wherein said first conduit means includes a pair of separate first conduits connecting the respective ones of said first and second orifice means and said air-water-sediment inlets on said air-water-sediment separators together, wherein said third and fourth orifice means are located at a single common location on the underside of said wing, wherein said second conduit means includes a second conduit connecting the respective ones of said air outlets to said first means, and wherein said third means includes a third conduit connecting said common third and fourth orifice means to said first means.

3. The aircraft instrument system according to claim 1, wherein said air-water-sediment separator means includes a valve accessible on an external surface of said wing for facilitating an emptying of said sediment collection chamber.

4. The aircraft instrument system according to claim 1, wherein said air-water separator means includes means defining a bleed hole providing limited air communication between the exterior and interior thereof, said bleed hole effecting a pressure drop between the air entering said air-water inlet and air leaving said air-water separator means via said air outlet and said bleed hole providing means for water to pass out of said air-water-sediment separator.

5. The aircraft instrument system according to claim 4, wherein said air-water-sediment separator means comprises an elongated and upright hollow tubular housing having at the upper end thereof said air-water inlet and at the lower end thereof said sediment collection chamber, said bleed hole extending through the wall of said tubular housing above said sediment collection chamber, said air outlet being defined by means defining an opening in said wall of said tubular housing above said sediment collection chamber and a valve means adjacent said lower end of said sediment collection chamber for facilitating said emptying of sediment collected therein.

6. The aircraft instrument system according to claim 1, wherein said first means comprises a liquid manometer having four liquid containing tubes, two of said tubes being subject on one side of said liquid therein to one of said first and second pressures, respectively, each of the remaining two tubes being in liquid connection with one of the first mentioned two tubes and the liquid therein subjected to said third and fourth pressures which are equal to static pressure;
wherein each of said tubes is made of an electrically conductive metal and has an electrically conductive rod extending through the center thereof, said liquid between said rod and the metal wall of said tube creating a capacitance in each tube, said electrical circuit means effecting a conversion of said capacitance into said quotient signal.

7. The aircraft instrument system according to claim 6, wherein said tubes are vertically oriented in said compartment means and have electrically nonconductive end plates closing off the ends thereof, said securement means effecting a securement of the bottom one of said end plates to the upper surface of the wall defining the under surface of said wing.

8. The aircraft instrument system according to claim 7, wherein said bottom end plate has four internally threaded holes therein at the center of the joint between said metal tubes and said bottom wall, wherein the top one of said end plates has means defining four holes therethrough at the center of the joint between said metal tubes and said top wall, and wherein each of said electrically conductive rods has externally threaded ends, the lower threaded ends of each thereof being threadedly connected in said internally threaded holes, the upper threaded ends extending through said holes in said upper plate with a fastener being threadedly coupled to said threaded upper ends to effect a clamping of said metal tubes between said end plates.

* * * * *